United States Patent [19]

Ende

[11] 3,863,863

[45] Feb. 4, 1975

[54] SELF-THREADING TAPE HANDLING APPARATUS

[75] Inventor: Don S. Ende, Commack, N.Y.

[73] Assignee: Potter Instrument Company, Inc., Plainview, N.Y.

[22] Filed: June 30, 1972

[21] Appl. No.: 268,080

[52] U.S. Cl. .......... 242/182, 226/91, 226/97, 242/195, 242/197

[51] Int. Cl. .......... G11b 15/66, G11b 15/58

[58] Field of Search .......... 242/182, 183, 184, 185, 242/192, 195, 197, 210, 71.8, 74; 226/91, 92, 95, 97

[56] References Cited

UNITED STATES PATENTS

| | | | |
|---|---|---|---|
| 3,006,650 | 10/1961 | Ellmore | 242/71.8 X |
| 3,091,409 | 5/1963 | Goodale | 242/182 X |
| 3,134,527 | 5/1964 | Willis | 226/97 |
| 3,149,797 | 9/1964 | Pastor et al. | 242/195 |
| 3,258,183 | 6/1966 | Weissbach | 242/182 X |
| 3,289,960 | 12/1966 | Willis | 242/183 |
| 3,334,831 | 8/1967 | Bradt | 242/197 |
| 3,371,882 | 3/1968 | Orlando et al. | 242/209 |
| 3,393,878 | 7/1968 | Aweida et al. | 242/182 |
| 3,465,938 | 9/1969 | McCammon et al. | 242/182 |
| 3,627,226 | 12/1971 | Setter | 242/185 |
| 3,643,890 | 2/1972 | Milligan et al. | 242/182 |
| 3,761,035 | 9/1973 | Wang | 242/195 X |

*Primary Examiner*—George F. Mautz
*Attorney, Agent, or Firm*—Lane, Aitken, Denner & Ziems

[57] ABSTRACT

A rotatable take-up reel is mounted directly below and in parallel with a rotatable supply reel. A pair of parallel adjacent vacuum columns are vertically arranged on one side of the reels with a head assembly interposed between the reels and the vacuum columns. The free end of the tape wound on the supply reel is lifted off of the reel by means of a stationary jet which directs a fluid stream across the periphery of the supply reel transversely to the plane of the reel. As the supply reel turns, the free end of the tape is directed through the head assembly by gravity and guide surfaces. A vacuum hub within the take-up reel draws the tape into attachment.

25 Claims, 2 Drawing Figures

SELF-THREADING TAPE HANDLING APPARATUS

BACKGROUND OF THE INVENTION

The invention relates generally to the handling of thin elongated flexible strips, films or tapes, and more particularly to improvements in automatic tape threading systems.

Information stored in high quality magnetic tapes used in modern data systems is extremely susceptible to loss through damage and contamination of the tape by careless handling. With improvements in magnetic tape composition, tape transports, record/play heads and associated circuitry, the increased density with which information can be packed on the magnetic tape has emphasized the need for protecting the tape from environmental hazards.

Automatic threading systems have been devised to reduce the risk of careless handling by an operator. In the most pertinent systems known, the supply and take-up reels, also called file and machine reels respectively, are mounted side by side in horizontally spaced relation with the head assembly and vertical vacuum columns or buffer bins below the reels. In one such arrangement the free end of the tape is blown by a series of directional jets across the lateral gap between the reels through the head assembly. The take-up reel is equipped with a vacuum hub in the form of a perforated central spool which attracts the free end of the tape and retains the tape while it is wound onto the take-up reel. The free end of the tape is initially peeled off of the supply reel either by gravity as the supply reel rotates or, in one system, by pneumatic jets located on a removable cartridge adjacent to a window formed in the cartridge at the lower periphery of the supply reel. The jets are aimed tangentially to this periphery in the plane of the supply reel. As the free end of the tape encounters the air stream, the tape end is dislodged or peeled from the reel and passes out of the window under the influence of gravity. This system is complicated by the location of the jets on the tape cartridge. When removing the cartridge, the fluid supply line must be uncoupled in some manner. Moreover, the use of additional air jets to blow the tape end over to the take-up reel requires a complex arrangement of nozzles to prevent excessive tape flutter. In addition, the horizontally spaced reels and vertical vacuum bins consume an excessive amount of space.

SUMMARY OF THE INVENTION

Accordingly, the general purpose of the invention is to improve self-threading systems for magnetic tape reels and the like. One of the specific objects of the invention is to transfer the tape from the supply reel to the take-up reel without using a complicated network of directional jets. Another object of the invention is to make the arrangement of the reels, play/record head and vacuum columns more compact. A further object of the invention is to provide a tape extraction mechanism which is separate from the supply reel and its cartridge, if any, and does not rely on gravity.

These and other objects of the invention are accomplished by a self-threading tape transport system in which rotatable, parallel supply and take-up reels are mounted in vertically spaced relation with the take-up reel directly below the supply reel. A stationary jet located adjacent to the upper periphery of the supply reel directs a stream of pressurized fluid across the tape transversely to the plane of the reel. The fluid stream creates a localized low pressure area or partial vacuum adjacent to the periphery of the reel. The resulting suction tends to lift the free end of the tape off of the reel as the end approaches the fluid stream. Guide surfaces are positioned at one side of the supply and take-up reels for defining a substantially vertical channel through which the tape is drawn by gravity after the free end of the tape is extracted from the supply reel. The take-up reel includes an attachment mechanism which draws the tape onto the take-up reel after the free end of the tape has traversed the channel.

In the embodiment described below, a pair of vertical vacuum columns are arranged beside the vertically spaced reels. A read/write head assembly containing drive capstans is mounted between the reels and the vacuum columns. The vacuum columns have openings at opposite respective ends into which corresponding portions of the tape are drawn when suction is applied at the closed ends of the columns. The supply reel is received in a cartridge assembly surrounding the periphery of the reel. A tape exit window is formed along the upper periphery of the cartridge. A separate fluid jet assembly is mounted adjacent to the cartridge window and is equipped with a plurality of ports for directing pressurized streams of fluid across the outside of the window substantially at right angles to the plane of the reel. When the free end of the tape passes beneath the cartridge window as the reel rotates, the streams tend to lift the tape end off of the reel and outwards through the window. As the supply reel continues to rotate, the tape is fed from the supply reel through the window into a tape transfer channel. Drawn by gravity, the free end of the tape passes between guide surfaces defining the channel through the head assembly.

The take-up reel is furnished with a porous hub connected to a vacuum source. The partial vacuum created at the center of the take-up reel tends to draw the tape end onto the hub of the take-up reel. The tape is retained by the hub and wound on the take-up reel as it rotates.

After this stage of the threading operation is complete, the take-up reel is stopped and the vacuum columns are activated. The suction draws a tape loop from between the take-up reel and the head assembly into one of the columns. Similarly, the other vacuum column receives a tape loop drawn from between the supply reel and the head assembly. The loops drawn into the columns serve as buffers on either side of the head assembly to isolate the tape from the reels by introducing a controlled amount of slack which insures quick, precise starting and stopping at the head assembly without requiring the same degree of responsiveness in the reel drive units.

DESCRIPTION OF A PREFERRED EMBODIMENT

Figure 1:
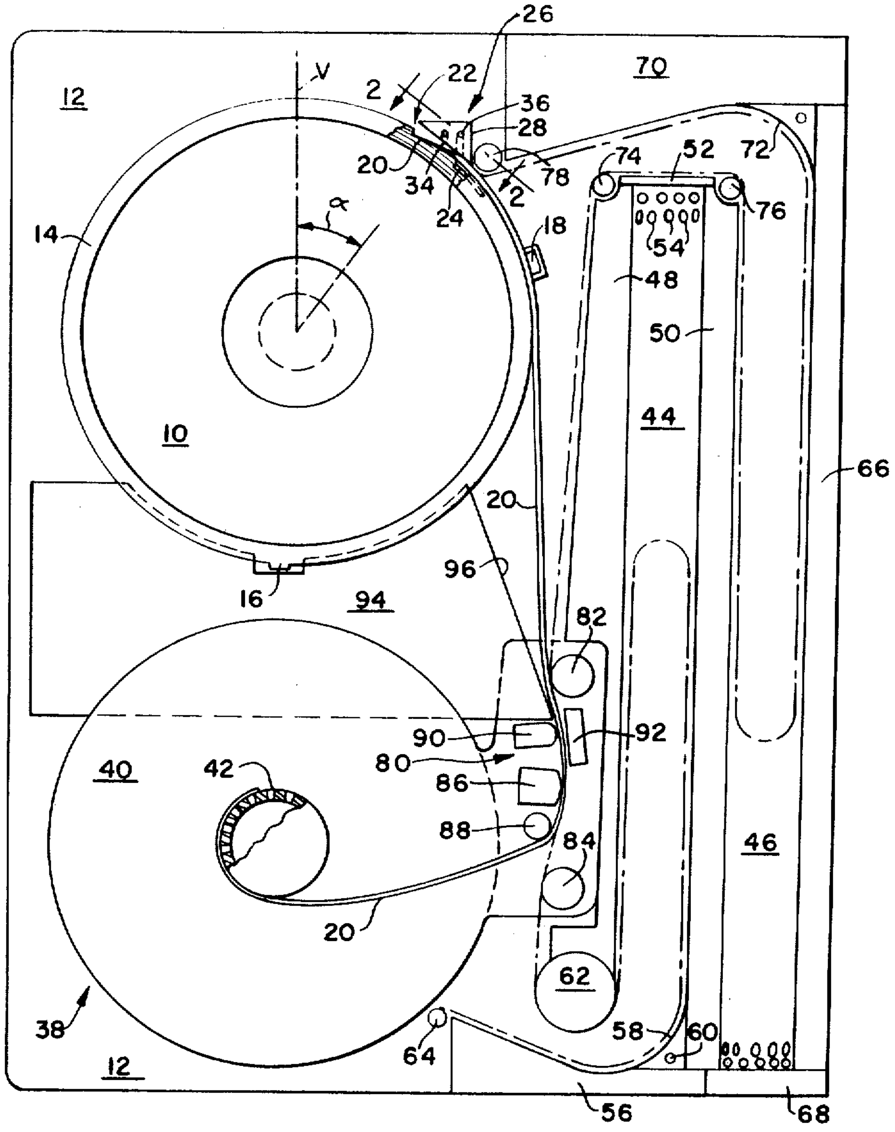
FIG. 1 represents a side view of an embodiment according to the invention illustrating the vertical arrangement of the supply and take-up reels.
Figure 2:
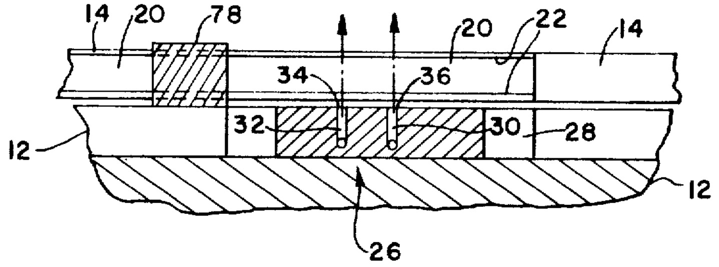
FIG. 2 is a sectional view taken along lines 2—2 of FIG. 1 illustrating the tape exit window and extraction jets.

The self-threading magnetic tape system illustrated in FIG. 1 is designed for high speed storage and retrieval of digital information on magnetic tape and is normally associated with a digital computer or other data processing system. A disc-shaped supply reel 10 is mounted on a vertical deck or platform 12 for rotation about a horizontal axis. The supply reel 10 is mounted within a stationary cartridge comprising a ring 14 having a generally U-shaped section enclosing the periphery of the reel 10. Keys 16 and 18 are formed on the exterior of the cartridge ring 14 and are received in mating notches formed in the platform 12 to orient the cartridge ring 14 in a fixed position. Flexible magnetic tape 20 in the form of an elongated strip wound upon the supply reel 10 is extracted from the reel through an elongated tape exit window 22 (FIG. 2) formed in the upper periphery of the cartridge ring 14. A curved door 24 is slidably mounted in the ring 14 for opening and closing the window 22. In FIGS. 1 and 2 the door 24 is shown in its opened position. The door 24 may be connected to a motor (not shown) or other drive means for automatic operation, if desired. A pneumatic jet assembly 26 is mounted adjacent to the cartridge window 22 behind the plane of the reel 10 (as viewed in FIG. 1) so as not to obstruct the window 22. The jet assembly 26 includes a member 28 affixed to the mounting platform 12, but separate from the cartridge ring 14, so that the cartridge and reel may be removed without interfering with the jet assembly 26. A pair of bores 30 and 32 are formed through the member 28 and are connected at one end to a source (not shown) of pressurized air, or other suitable fluid. The bores 30 and 32 terminate respectively in ports 34 and 36 which direct respective streams of air across the outside of the window 22 at right angles to the plane of the reel 10 in the directions indicated by the dot-dashed lines of FIG. 2. The two ports 34 and 36 are arranged in staggered fashion such that port 34 is closer to the window than the port 36 and the port 36 is displaced from the port 34 in the direction of the movement of the tape on the reel beneath the window 22.

The location of the window 22 and jet assembly 26 about the circumference of the cartridge ring 14 is preferably in the first quadrant of the circular space occupied by the reel as measured clockwise from a vertical line, *v*, (FIG. 1) passing through the rotational axis of the supply reel 10. Preferably the angular positon, $\alpha$, at which the window 22 is centered is about 35°. The angle $\alpha$ is determined as the smallest angle which will allow the tape once extracted from the reel 10 both to be consistently and smoothly drawn by gravity into the tape transfer channel. The small angle $\alpha$ also permits the entrance to the associated vacuum column to be located near the top of the supply reel 10, as explained below.

A disc-shaped take-up reel 38 is mounted for rotation on the platform 12 below the supply reel 10 and in vertical alignment therewith. The planes of rotation of the supply reel 10 and take-up reel 38 are approximately the same. The take-up reel 38 comprises a fixed case 40 enclosing a rotatable reel having a vacuum hub 42. The vacuum hub 42 is formed by a porous or perforated ring at the center of the take-up reel 38. The interior of the hub 42 is connected to a hollow axle coupled to a vacuum source (not shown). The hub 42 provides radially inward suction for attracting the tape 20.

A pair of vertical vacuum columns 44 and 46 are arranged in parallel beside the supply reel 10 and take-up reel 38 on the side toward which the tape is fed by the supply reel 10. The vacuum columns 44 and 46 comprise elongated J-shaped chambers having a width in a direction perpendicular to the paper of FIG. 1 slightly in excess of the width of the tape 20. The vacuum column 44 is defined in part by an elongated vertical sidewall or partition 48 on one side and a parallel partition 50 on the other side. The upper end of the vacuum column 44 is enclosed by a horizontal plate 52. Ports 54 in the upper end of the vacuum column 44 are connected to a vacuum source (not shown). The lower end of the column 44 is open for receiving the tape 20. A horizontal partition 56 is connected to the partition 50 at the bottom of the column 44. The lower right hand corner of the column 44 as viewed in FIG. 1, where the partitions 50 and 56 meet, is furnished with a curved porous surface 58. A vacuum port 60 is located in the enclosure formed by the surface 58 and partitions 50 and 56 to hold the tape in the column 44. At the lower end of the vertical partition 48, fixed air bearing 62 forms one side of the opening to the vacuum column 44. Another fixed air bearing 64 is situated at the end of the horizontal partition 56 defining the other side of the mouth for the column 44. The air bearings 62 and 64 comprise curved porous surfaces through which air is blown to prevent frictional contact while changing the direction of the tape.

The other vacuum column 46 is similar to the column 44, but inverted. The partition 50 serves as a common vertical sidewall between the column 44 and 46. The other side of the column 46 is defined by another vertical partition 66. A horizontal plate 68 encloses the lower end of the column 46 at which the vacuum ports are located. The partition 66 is connected at its upper end to a horizontal partition 70 corresponding to the lower partition 56 associated with the column 44. A similar porous corner surface 72 is provided at the juncture of the partitions 66 and 70. A pair of fixed air bearings 74 and 76 are located at the upper ends of the partitions 48 and 50. Another air bearing 78 is located between the end of the horizontal partition 70 and the jet assembly 26 associated with the supply reel 10. The bearing 78 defines one side of the opening to the vacuum column 46. The other side of the opening is defined by the bearing 74. The air bearings associated with both vacuum column 44 and 46 are all of similar design.

A magnetic head assembly 80 is mounted on the partition 48 between the vacuum column 44 and the take-up reel 38. The head assembly 80 includes a pair of drive capstans 82 and 84 for moving the tape across a magnetic read/write head 86. A bearing surface 88 is provided directly below the head 86. A pair of opposed guides 90 and 92 are located above the head 86. A guide plate 94 is affixed to the platform 12 between the reels 10 and 38 providing a diagonal guide surface 96 leading into the head assembly 80. The guide surface 96 extends from the lower side of the supply reel 10 to the guide members 90 and 92 on the head assembly 80.

The self-threading operation is begun, with the vacuum columns off, by rotating the supply reel 10 (clockwise as viewed in FIG. 1) so that the periphery of the tape wound on the reel 10 passes beside the window 22 across which the streams of air from the ports 34 and 36 flow. As the tape end passes beneath the window 22, the end is lifted out through the window by the suction created by the air streams; and as the reel 10 continues to rotate, the tape end, drawn by gravity, descends towards the surface 96 which guides the tape into the magnetic head assembly 80. The tape continues through the head assembly 80 between the guide members 90 and 92, alongside the head 86 and past the bearing 88. As the tape continues beyond the head assembly 80, the inward suction created by the vacuum hub 42 tends to attract the tape to the center of the take-up reel 38. As the supply reel continues to pay out the tape, the tape is drawn to the hub 42 and wound thereon as the take-up reel 38 rotates. Detecting the closure of the holes in the porous hub 42 as the tape is wound on the take-up reel 38, a pressure sensitive switch causes the take-up reel to stop. At this time, the vacuum columns 44 and 46 are activated drawing loops of tape (dot-dashed lines, FIG. 1) into each column as the supply reel 10 continues to rotate. Conventional position sensing devices (not shown) in the vacuum columns terminate the threading operation when the tape loops drawn into the vacuum columns reach predetermined levels.

Those skilled in the art will recognize that the use of a cartridge ring 14 or similar structure is not necessary to the tape threading operation but serves only as an enclosure to prevent contamination by foreign matter. Any or all of the fixed air bearings used throughout the system may be replaced by suitable rollers or pulleys, if desired. In addition, any of the bearing surfaces, such as diagonal surface 96, may comprise perforated or porous plates through which air is blown to prevent frictional contact between the tape and the solid surface.

While an embodiment of the self-threading tape system according to the invention has been disclosed in connection with magnetic tape handling apparatus, the central features of the system are equally applicable to other devices in which an elongated flexible strip would on one reel must be transferred automatically to another reel.

The invention provides numerous advantages over prior art equipment in which, for example, tape was extracted from a supply reel by gravity and then blown laterally across a tape transfer channel to a take-up reel mounted horizontally beside the supply reel. The vertical arrangement of the supply and take-up reels according to the invention allows a more compact arrangement beside the vacuum columns, instead of above the vacuum columns as in prior art tape handlers. Because the tape is lifted off the supply reel at a point near the top of the reel periphery, the vacuum column opening may also be near the top of the reel. Thus the length of the columns is approximately equal to the height of the vertical space occupied by the two reels. In practice this length, besides adding to the compactness of the system, has been found suitable for proper operation of the vacuum column arrangement. Complicated pneumatic systems for blowing the tape through the tape transfer channel via the head assembly are also avoided by the vertical arrangement. The tape end extraction system for the supply reel does not interfere with the reel itself or with the cartridge, but comprises a separate stationary assembly mounted directly on the platform or tape deck.

It will be understood that various changes in the details, materials, steps and arrangements of parts which have been herein described and illustrated in order to explain the nature of the invention, may be made by those skilled in the art within the principle and scope of the invention as expressed in the appended claims.

I claim:

1. A system for threading an elongated flexible medium from a supply reel to a take-up reel, comprising a rotatably mounted supply reel, a take-up reel rotatably mounted substantially vertically below said supply reel, guide means for defining a gravity feed medium transfer channel between the peripheries of said reels, and medium extraction means located at a predetermined position adjacent the periphery of the supply reel for lifting the free end of the medium off of said supply reel and into said transfer channel, said extraction means including jet means located externally to said supply reel for directing a fluid stream across said supply reel periphery parallel to the rotational axes of said supply reel.

2. The system of claim 1, wherein said jet means is positioned at the upper periphery of said supply reel.

3. The system of claim 1, wherein said jet means is positioned in the first quadrant of said supply reel periphery measured from a vertical line intersecting the rotational axis of said supply reel.

4. A system for threading an elongated flexible medium from a supply reel to a take-up reel, comprising a rotatably mounted supply reel, cartridge means defining a tape exit window from said supply reel located at a predetermined position in an upper quadrant of the supply reel periphery measured from a vertical line intersecting the rotational axis of said supply reel, a take-up reel rotatably mounted substantially vertically below said supply reel, guide means for defining a gravity feed medium transfer channel between said tape exit window and said take-up reel, and jet means located outside of said window for creating a low pressure area at said window to suck the free end of the medium off of said supply reel and to allow said free end to fall into said transfer channel.

5. The system of claim 4, wherein said predetermined position of said exit window in said upper quadrant of the supply reel periphery is in the first 60° of said upper quadrant measured from said vertical line.

6. The system of claim 4, wherein said jet means includes means for directing a fluid stream across said window without interfering with the ability of said tape to fall freely through said transfer channel.

7. The system of claim 4, wherein said jet means includes means for directing a fluid stream across the outside of said window transversely to the plane of said reel.

8. The system of claim 4, further comprising a head assembly for extracting information from said medium positioned in said transfer channel.

9. The system of claim 8, wherein said transfer channel is defined through said head assembly.

10. The system of claim 9, wherein said medium is magnetic tape.

11. The system of claim 9, further comprising vacuum means arranged beside said head assembly for producing a controlled amount of slack in said medium between said head assembly and at least one of said reels.

12. The system of claim 11, wherein said vacuum means includes a first elongated vacuum column vertically arranged beside said head assembly having an open end into which a loop of said medium is drawn between said head assembly and one of said reels.

13. The system of claim 12, wherein said vacuum means includes a second elongated vacuum column vertically arranged beside and parallel to said first column having an open end opposite from the open end of said first column into which a loop of said medium is drawn between said head assembly and the other one of said reels.

14. The system of claim 9, wherein said take-up reel has means for drawing the medium into operative attachment to said take-up reel.

15. The system of claim 14, wherein said drawing means includes a vacuum hub.

16. A system for threading a flexible tape from a supply reel to a take-up reel, comprising rotatably mounted supply and take-up reels, said take-up reel being positioned vertically below and parallel to said supply reel and having means for drawing nearby tape into operative attachment to said take-up reel, cartridge means for enclosing at least a part of said supply reel having a tape-exit window located at a predetermined position in an upper quadrant of the supply reel periphery measured from a vertical line intersecting the rotational axis of said supply reel, jet means mounted externally to said cartridge means adjacent said window for blowing a fluid across said window to lift the free end of said tape out through said window, a head assembly mounted between said reels, and guide means for defining a gravity feed tape transfer channel from said window past said head assembly to the periphery of said take-up reel, whereby the free end of the tape is lifted through said window into said transfer channel, pulled through said channel by gravity as said supply reel rotates and drawn into attachment to said take-up reel.

17. The system of claim 16, wherein said jet means directs a fluid stream across the outside of said window transversely to the plane of said supply reel.

18. The system of claim 17, wherein said stream is directed substantially at right angles to the plane of said supply reel.

19. The system of claim 16, wherein said take-up reel drawing means includes a vacuum hub.

20. The system of claim 16, further comprising vacuum means arranged beside said transfer channel for producing a controlled amount of slack in said tape between said head assembly and at least one of said reels.

21. The system of claim 20, wherein said vacuum means includes a first elongated vacuum column vertically arranged beside said transfer channel having an open end into which a loop of tape is drawn between said head assembly and one of said reels.

22. The system of claim 21, wherein said vacuum means includes a second elongated vacuum column vertically arranged beside and parallel to said first column having an open end opposite the open end of said first column into which a loop of tape is drawn between said head assembly and the other one of said reels.

23. Apparatus for extracting flexible tape from a reel on which said tape is wound, comprising cartridge means for enclosing at least a portion of the periphery of the reel having a tape exit window, and jet means located outside of said window external to said cartridge means for directing a pressurized fluid stream across said window parallel to the rotational axis of said reel to lift the free end of said tape out through said window.

24. A system for extracting tape from a reel on which the tape is wound, comprising a rotatable reel, and jet means mounted externally to the reel adjacent to the periphery thereof for directing a pressurized fluid stream across said periphery parallel to the rotational axis of said reel in order to lift the free end of said tape off of said reel.

25. A tape extraction method, comprising the step of directing a stream of fluid across the periphery of a rotating reel of flexible tape parallel to the rotational axis of the reel in order to lift the free end of the tape off of the reel as it passes beside the stream.

* * * * *